US010244218B2

United States Patent
Yamamoto et al.

(10) Patent No.: US 10,244,218 B2
(45) Date of Patent: Mar. 26, 2019

(54) IMAGE PROCESSING APPARATUS, IMAGE PROCESSING SYSTEM, IMAGE PROCESSING METHOD, AND NON-TRANSITORY COMPUTER READABLE MEDIUM

(71) Applicant: FUJI XEROX CO., LTD., Tokyo (JP)

(72) Inventors: Takayuki Yamamoto, Kanagawa (JP); Makoto Sasaki, Kanagawa (JP); Shota Narumi, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 74 days.

(21) Appl. No.: 15/368,782

(22) Filed: Dec. 5, 2016

(65) Prior Publication Data
US 2017/0295351 A1   Oct. 12, 2017

(30) Foreign Application Priority Data

Apr. 7, 2016  (JP) ................. 2016-077612

(51) Int. Cl.
| H04N 9/73 | (2006.01) |
| H04N 9/04 | (2006.01) |
| H04N 5/225 | (2006.01) |
| H04N 5/232 | (2006.01) |
| H04N 1/60 | (2006.01) |
| G06T 5/00 | (2006.01) |

(52) U.S. Cl.
CPC ............ *H04N 9/735* (2013.01); *G06T 5/009* (2013.01); *H04N 1/6027* (2013.01); *H04N 1/6077* (2013.01); *H04N 1/6086* (2013.01); *H04N 5/2256* (2013.01); *H04N 5/23216* (2013.01); *H04N 9/045* (2013.01)

(58) Field of Classification Search
CPC ...................................... H04N 5/232
See application file for complete search history.

(56) References Cited

U.S. PATENT DOCUMENTS

2006/0132870 A1\* 6/2006 Kitajima ............. H04N 9/735
358/516

FOREIGN PATENT DOCUMENTS

| JP | 2012-134625 A | 7/2012 |
| JP | 5740147 B2 | 6/2015 |

OTHER PUBLICATIONS

Daniel J.Jobson et al., "A Multiscale Retinex for Bridging the Gap Between Color Images and the Human Observation of Scenes", IEEE Transactions on Image Processing, Jul. 1997, vol. 6, No. 7.

\* cited by examiner

*Primary Examiner* — Mark T Monk
(74) *Attorney, Agent, or Firm* — Sughrue Mion, PLLC

(57) ABSTRACT

An image processing apparatus includes an illumination light intensity calculating unit that determines, from a brightness value based on a pixel value of each pixel forming an original image, an illumination light intensity image having as a pixel value an illumination light component of the original image, using at least one smoothed image having the brightness value that is smoothed using at least a smoothing degree, and a light source color calculating unit that determines an illumination light source color as a light source color of illumination light in accordance with the original image and the illumination light intensity image.

9 Claims, 15 Drawing Sheets

$\sigma^2$ = SMALL $\sigma^2$ = MEDIUM $\sigma^2$ = LARGE

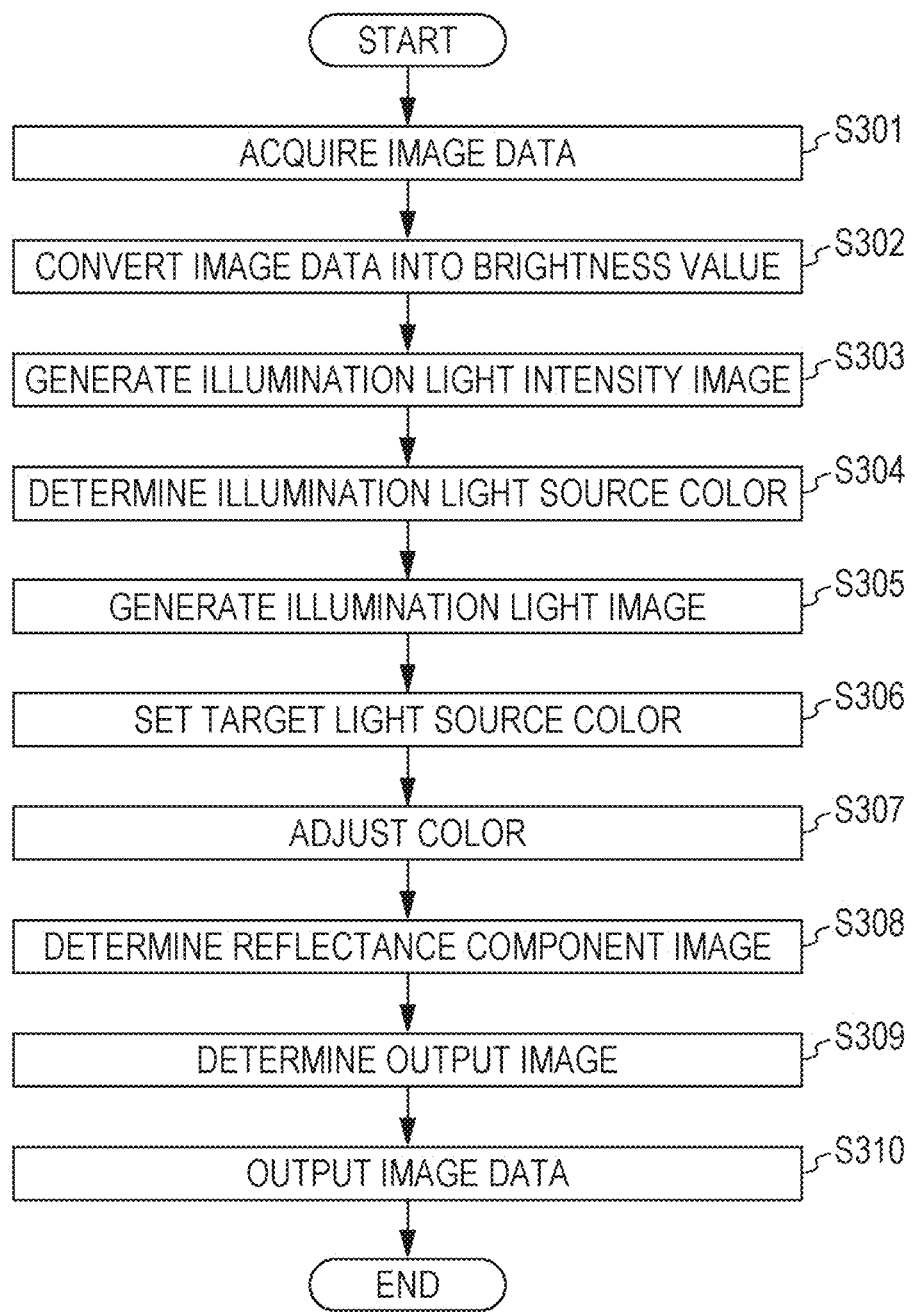

IMAGE PROCESSING APPARATUS, IMAGE PROCESSING SYSTEM, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-077612 filed Apr. 7, 2016.

BACKGROUND (i) Technical Field

The present invention relates to an image processing apparatus, an image processing system, an image processing method, and a non-transitory computer readable medium.

(ii) Related Art

More users today are photographing and viewing digital images as devices, such as digital cameras, smart phones, or tablets are in widespread use. As photographing opportunities of images increase, photographing environments are diversified. Auto-white balancing technique is available as a technique of adjusting color shades of images photographed under environments of a variety of lighting conditions. The auto-white balancing technique sets a light source color of an image to be close to white light. In related art techniques, the color shade is typically adjusted using features of pixel values.

An image photographed by a digital camera is sometimes different from a scene a person views, particularly if a difference between a dark portion and a light portion of an object is large, for example, if a photographing operation is performed in a backlight condition or if a photographed view includes an indoor portion and an outdoor portion. A technique available to address this problem improves visibility through image processing. The image processing is based on the retinex principle and improves visibility of an object by adjusting a dynamic range in response to a single image. The retinex principle is based on the premise that humans perceive reflectance, and an image is separated into an illumination light component and a reflectance component, and the reflectance component is enhanced to increase visibility of the object. In this way, the image is set to be close to the scene the person actually sees and the visibility of the object is thus increased.

SUMMARY

According to an aspect of the invention, there is provided an image processing apparatus. The image processing apparatus includes an illumination light intensity calculating unit that determines, from a brightness value based on a pixel value of each pixel forming an original image, an illumination light intensity image having as a pixel value an illumination light component of the original image, using at least one smoothed image having the brightness value that is smoothed using at least a smoothing degree, and a light source color calculating unit that determines an illumination light source color as a light source color of illumination light in accordance with the original image and the illumination light intensity image.

BRIEF DESCRIPTION OF THE DRAWINGS

Exemplary embodiments of the present invention will be described in detail based on the following figures, wherein:

FIG. 11 is a flowchart illustrating a process of an image processing apparatus 10 of a third exemplary embodiment;

DETAILED DESCRIPTION

Embodiments of the present invention are described in detail with reference to the drawings.

Figure 1:
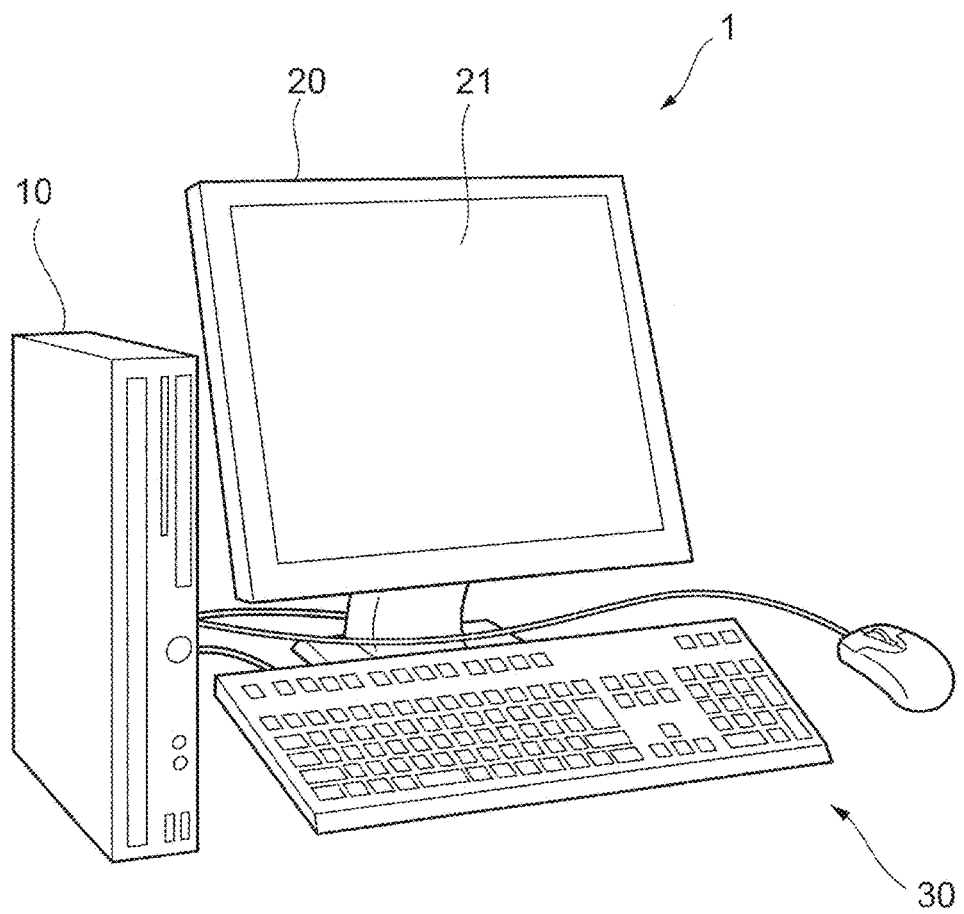
FIG. 1 illustrates a configuration of an image processing system of an exemplary embodiment.

FIG. 1 illustrates a configuration of an image processing system 1 of an exemplary embodiment.

Referring to FIG. 1, the image processing system 1 of the exemplary embodiment includes an image processing apparatus 10, a display 20, and an input device 30. The image processing apparatus 10 performs image processing on image information of an image displayed on the display 20. The display 20 displays the image in accordance with the image information when the image information produced by the image processing apparatus 10 is input. The input device 30 is used by a user to input a variety of information to the image processing apparatus 10.

The image processing apparatus 10 is a general-purpose personal computer (PC), for example. The image processing apparatus 10, controlled by an operating system (OS), causes a variety of software applications to run, thereby creating the image information.

The display 20 displays an image on a display screen 21. The display 20 includes a device that displays an image in additive color mixing. For example, the display 20 may be a liquid-crystal display for the PC, a liquid-crystal television receiver, or a projector. The display method of the display 20 is not limited to a liquid-crystal system. Referring to FIG. 1, the display 20 includes the display screen 21. If a projector is used for the display 20, the display screen 21 is a screen mounted external to the display 20.

The input device 30 includes a keyboard and a mouse. The input device 30 is used to start up or end a software application. As described in detail below, the input device 30 is also used to input a command to cause the image processing apparatus 10 to perform image processing when the image processing is performed.

The image processing apparatus 10 and the display 20 are connected to each other via a digital visual interface (DVI). The two apparatuses may also be connected to each other via a high-definition multimedia interface (HDMI (registered trademark)) or DisplayPort in place of the DVI.

The image processing apparatus 10 and the input device 30 are connected to each other via a universal serial bus (USB). The two apparatuses may also be connected via an IEEE1394 cable or an RS-232C cable in place of the USB.

In the image processing system 1, the display 20 displays an original image prior to image processing. When the user inputs to the image processing apparatus 10 a command to perform the image processing using the input device 30, the image processing apparatus 10 performs the image processing on the image information of the original image. The results of the image processing are reflected on the image displayed on the display 20. The image-processed image is thus rendered and thus displayed on the display 20. In this case, the user may perform the image processing in an interactive fashion while viewing the display 20. The user may thus perform the image processing job more intuitively and easily.

The image processing system 1 of the exemplary embodiment is not limited to the configuration of FIG. 1. For example, a tablet terminal may be used for the image processing system 1. In such a case, the table terminal includes a touchpanel. The touchpanel displays an image, and receives a command from the user. In other words, the touchpanel functions as the display 20 and the input device 30. Similarly, a touch monitor may be used as an integrated device of the display 20 and the input device 30. In the exemplary embodiment, a touchpanel is used for the display screen 21 of the display 20. The image processing apparatus 10 creates the image information, and the touch monitor displays an image responsive to the image information. The user inputs the command to perform the image processing by touching the touch monitor.

First Exemplary Embodiment

The image processing apparatus 10 is described as a first exemplary embodiment.

In accordance with the first exemplary embodiment, an illumination light source color of illumination light (a color of the illumination light) of an original image is determined in response to the original image.

Figure 2:
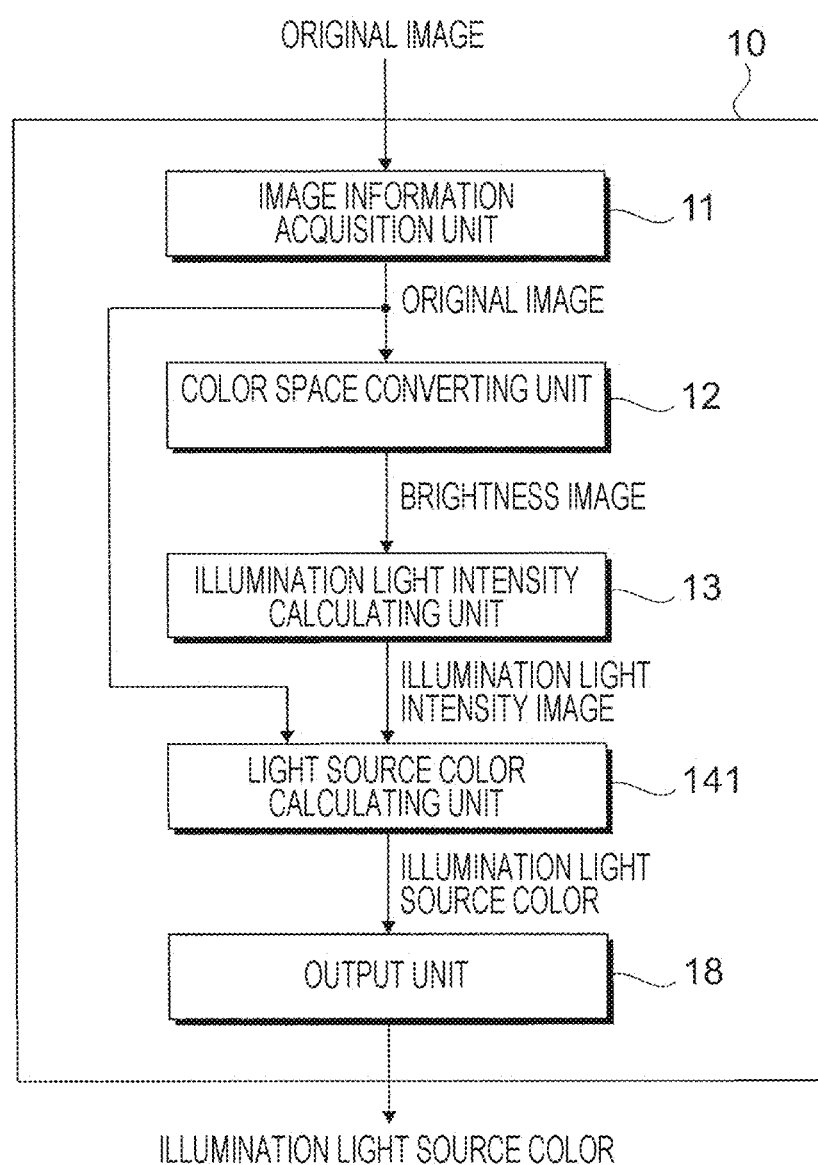
FIG. 2 is a block diagram illustrating a functional configuration of an image processing apparatus in accordance with a first exemplary embodiment.

FIG. 2 is a block diagram illustrating a functional configuration of the image processing apparatus 10 in accordance with the first exemplary embodiment. Referring to FIG. 2, functions related to the first exemplary embodiment from among a variety of functions of the image processing apparatus 10 are selectively illustrated.

As illustrated in FIG. 2, the image processing apparatus 10 includes an image information acquisition unit 11 that acquires image information, a color space converting unit 12 that converts color from a color in a color space to a color in a different color space, an illumination light intensity calculating unit 13 that calculates an intensity of illumination light, a light source color calculating unit 141 that calculates a light source color of the illumination light, and an output unit 18 that outputs processed data.

The image information acquisition unit 11 acquires the image information of an image (image data) that is to be image-processed. More specifically, the image information acquisition unit 11 acquires the image data of the original image prior the image processing. The image data may be RGB (red, green, and blue) video data (RGB data) to be displayed on the display 20.

The color space converting unit 12 converts the image data of the original image into image data in a color space different from the color space of the image data of the original image. In accordance with the first exemplary embodiment, the RGB data as the image data in the RGB color space is converted into V data in an HSV color space. In this case, it may also be understood that the color space converting unit 12 converts the original image of the RGB data into a brightness image of the V data.

Specifically, the brightness value may be determined as described below.

The pixel value of each pixel at coordinates (i,j) forming the original image may now be $(R,G,B)=(I_R(i,j), I_G(i,j), I_B(i,j))$. The color space converting unit 12 sets a maximum value of $I_R(i,j), I_G(i,j), I_B(i,j)$ to be a brightness value $V(i,j)$ in the HSV color space. The brightness value $V(i,j)$ is expressed by the following formula (1). The brightness value $V(i,j)$ is determined in accordance with each pixel value $I_R(i,j), I_G(i,j), I_B(i,j)$ of the original image. In formula (1), max represents a function that selects the maximum value of $I_R(i,j), I_G(i,j), I_B(i,j)$.

$$V(i,j)=\max\{I_R(i,j),I_G(i,j),I_B(i,j)\} \quad (1)$$

If the image data acquired by the image information acquisition unit 11 is the HSV data in the HSV color space, the color space converting unit 12 is not used. In such a case, the V data is directly used as the brightness value of each pixel of the original image.

The color space converting unit 12 converts herein the image data of the original image into the V data as the brightness value in the HSV color space. The first exemplary embodiment is not limited to this method. For example, the image data of the original image may be converted into Y data as the brightness value in the YCbCr color space or L* data as the brightness value in the L*a*b* color space, and the Y data or the L* data may be used.

The illumination light intensity calculating unit 13 determines, from the brightness value $V(i,j)$, an illumination light intensity image having as each pixel vale an illumination light component of an original image, using at least one smoothed image having the brightness value $V(i,j)$ that is smoothed using at least a smoothing degree. More specifically, an illumination light image is an image that includes an illumination light component when the original image is separated into the illumination light component and a reflectance light component through image processing based on retinex principle.

Figure 3:
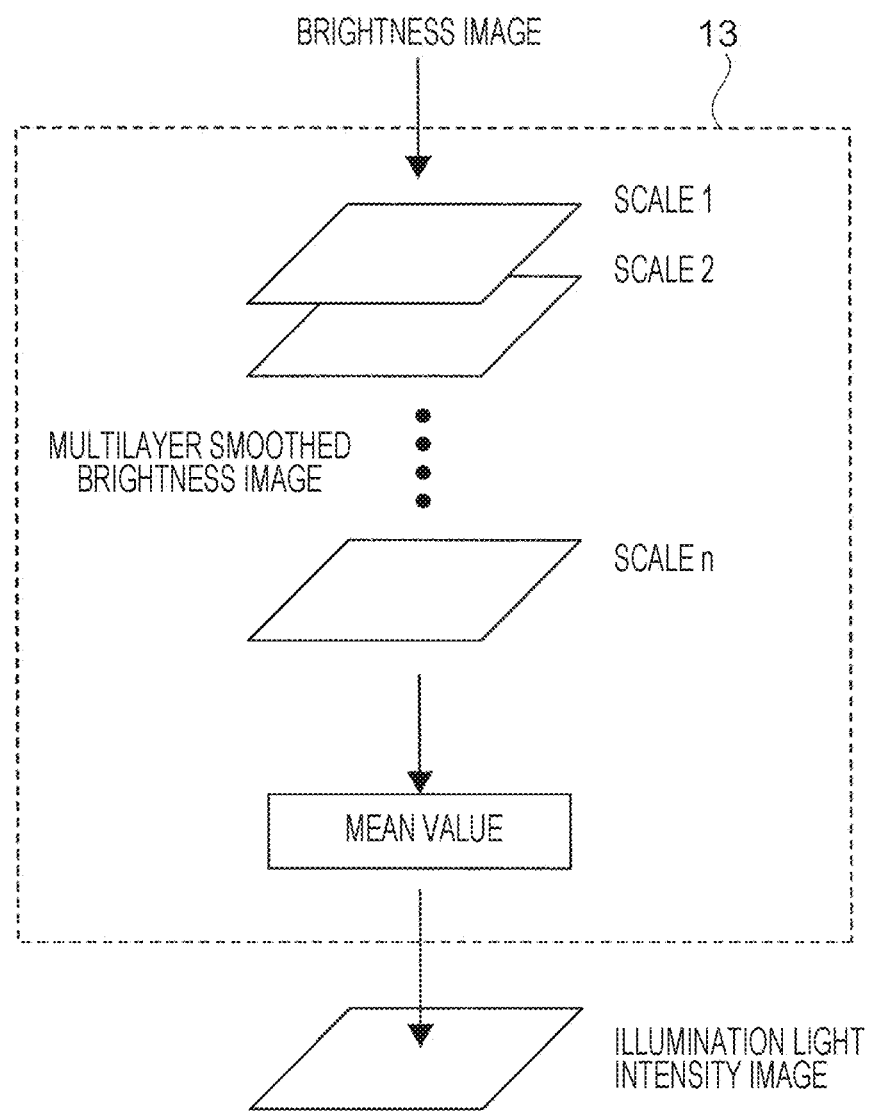
FIG. 3 illustrates a process performed by an illumination light intensity calculating unit.

FIG. 3 illustrates a process performed by the illumination light intensity calculating unit 13.

In order to perform this process, the illumination light intensity calculating unit 13 generates a smoothed image (smoothed brightness image) by smoothing a brightness image. In the smoothing operation, the Gaussian function expressed by formula (2) is used, for example.

$$G(x, y) = \frac{1}{2\pi\sigma^2} \exp\left(-\frac{x^2 + y^2}{2\sigma^2}\right) \quad (2)$$

Figure 4A:
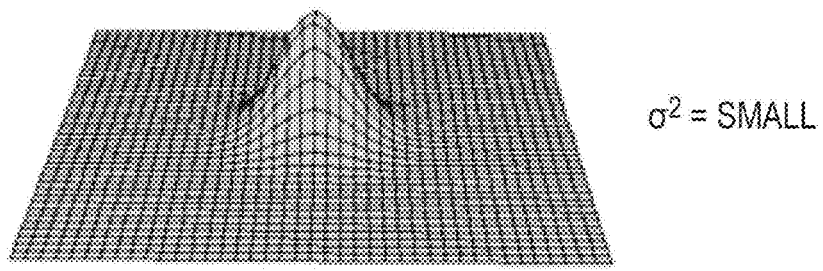
FIG. 4A through FIG. 4C conceptually illustrate shapes of Gaussian functions when variance $\sigma^2$ in formula (2) is varied.
Figure 4B:
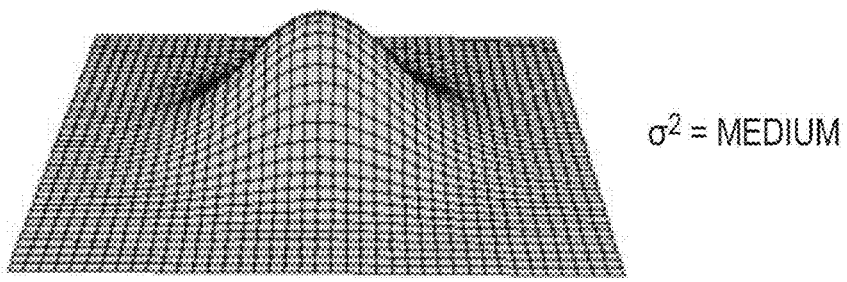
Figure 4C:
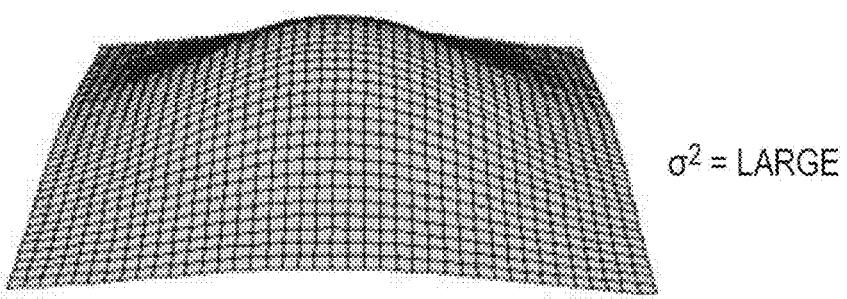

FIG. 4A through FIG. 4C conceptually illustrate shapes of the Gaussian function when variance $\sigma^2$ in formula (2) is varied.

FIG. 4A illustrates the shape of the Gaussian function when the variance $\sigma^2$ is set to be smaller. Similarly, FIG. 4B illustrates the shape of the Gaussian function when the variance $\sigma^2$ is set to be medium. FIG. 4C illustrates the shape of the Gaussian function when the variance $\sigma^2$ is set to be larger.

As illustrated in FIG. 4A through FIG. 4C, the smaller the variance $\sigma^2$ is, the sharper the shape of the Gaussian function is. The larger the variance $\sigma^2$ is, the broader the shape of the Gaussian function is.

Turning back to FIG. 3, the illumination light intensity calculating unit 13 generates the smoothed image (smoothed brightness image) having a different smoothing degree by performing on the brightness image a convolution operation using multiple Gaussian functions expressed by formula (2) with different variances $\sigma^2$. Referring to FIG. 3, the convolution operation is performed using the Gaussian functions with n variances $\sigma^2$, and n smoothed images (smoothed brightness images) result. FIG. 3 illustrates multiple layer brightness images of n layers of scale 1 through scale n. The frequency of the smoothed image (smoothed brightness image) varies by performing the convolution operation with the Gaussian functions of different variances $\sigma^2$. If the variance $\sigma^2$ is set to be smaller as illustrated in FIG. 4A, the frequency of the smoothed image (smoothed brightness image) becomes higher. If the variance $\sigma^2$ is set to be medium as illustrated in FIG. 4B, the frequency of the smoothed image (smoothed brightness image) becomes medium. If the variance $\sigma^2$ is set to be larger as illustrated in FIG. 4C, the frequency of the smoothed image (smoothed brightness image) becomes lower.

The illumination light intensity calculating unit 13 calculates a mean value of the multiple generated smoothed images (smoothed brightness images) on a per pixel basis. The mean value is an illumination light component $L_v(i,j)$. The convolution operation and the calculation of the mean value (the illumination light component $L_v(i,j)$) are expressed by the following formula (3). In the following formula (3), a symbol circle having the letter x therewithin represents the convolution operation. The image obtained as a result is an illumination light intensity image that is an image having as a pixel value an illumination light component of the original image.

$$L_V(i, j) = \frac{1}{n} \sum_n G_n \otimes V(i, j) \quad (3)$$

Multiple smoothed images (smoothed brightness images) are determined, and the mean value thereof is calculated. However, if at least one smoothed image (smoothed brightness image) is available, the image processing is possible. In the case of a single smoothed image (smoothed brightness image), the calculation of the mean value is not performed.

The mean value of the multiple smoothed images (smoothed brightness images) thus generated is calculated herein. Weights may be respectively set for the smoothed images (smoothed brightness images), and the weighted sum is calculated, and then represented by $L_v(i,j)$. In this case, $L_v(i,j)$ is represented by formula (4). $W_n$ in formula (4) is a weight set for each smoothed image (smoothed brightness image).

$$L_V(i, j) = \sum_n W_n G_n \otimes V(i, j) \quad (4)$$

The Gaussian function expressed formula (2) is used as a smoothing filter to generate the smoothed image (smoothed brightness image) for smoothing purposes. The first exemplary embodiment is not limited to the Gaussian function. For example, a bilateral filter available as a smoothing filter for edge preservation may be used.

Turning back to FIG. 2, based on the illumination light intensity image, the light source color calculating unit 141 determines the illumination light source color that is a light source color of the illumination light to the original image.

More specifically, the light source color calculating unit 141 determines the illumination light source color by calculating the weighted mean of the pixel values of the original image with each weight being a pixel value of the illumination light intensity image corresponding to the pixel value of the original image.

The illumination light source color C is the RGB data, and expressed using the following formulas (5) and (6). In formula (6), the pixel value of the original image is $I_R(i,j)$, $I_G(i,j)$, $I_B(i,j)$. The weighted mean is calculated using as a weight the pixel value $L_v(i,j)$ of the illumination light intensity image corresponding to the pixel value of the original image, namely with the pixel value $L_v(i,j)$ of the illumination light intensity image and the corresponding pixel value of the original image being at the same coordinates. Color data including the RGB data expressed by formula (5) is determined as the illumination light source color C.

$$C = (\overline{L}_R, \overline{L}_G, \overline{L}_B) \quad (5)$$

$$\overline{L}_R = \frac{\sum_{i,j} L_V(i, j) I_R(i, j)}{\sum_{i,j} L_V(i, j)} \quad (6)$$

$$\overline{L}_G = \frac{\sum_{i,j} L_V(i, j) I_G(i, j)}{\sum_{i,j} L_V(i, j)}$$

$$\overline{L}_B = \frac{\sum_{i,j} L_V(i, j) I_B(i, j)}{\sum_{i,j} L_V(i, j)}$$

The output unit 18 outputs information of a desired illumination light source color C. The information of the illumination light source color C may be displayed on the display 20 (see FIG. 1) or may be used as information to perform another image processing operation.

A process of the image processing apparatus 10 of the first exemplary embodiment is described below.

Figure 5:
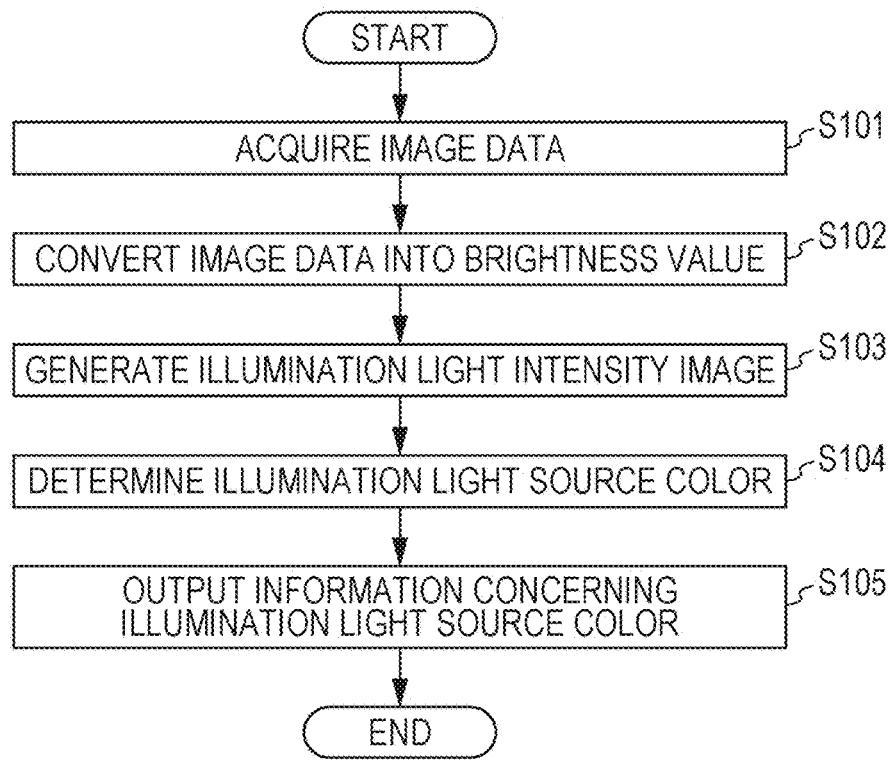
FIG. 5 is a flowchart illustrating a process performed by the image processing apparatus of the first exemplary embodiment.

FIG. 5 is a flowchart illustrating the process of the image processing apparatus 10 of the first exemplary embodiment.

The image information acquisition unit 11 acquires the image data of the original image (step S101). The image data of the original image is the RGB data, for example.

The color space converting unit 12 converts the RGB data as the image data of the original image into the V data that is a brightness value in the HSV color space (step S102). This conversion may be performed using formula (1), for example.

Using the Gaussian function expressed by formula (2), the illumination light intensity calculating unit 13 generates multiple smoothed images (smoothed brightness images) by performing the convolution operation on the brightness image including the V data, and then generates the illumination light intensity image by calculating the mean value of the multiple smoothed images (smoothed brightness images) on a per pixel basis (step S103). This operation may be performed in accordance with formula (3).

The light source color calculating unit 141 determines the illumination light source color by calculating the weighted mean of the pixel values of the original image using as a weight the pixel value of the illumination light intensity image (step S104). This operation may be performed in accordance with formulas (5) and (6), for example.

The output unit 18 outputs information of the illumination light source color (step S105).

In accordance with the first exemplary embodiment, a more accurate illumination light source color is obtained by using the illumination light component based on the retinex principle.

Second Exemplary Embodiment

An image processing apparatus 10 of a second exemplary embodiment is described below.

In accordance with the second exemplary embodiment, an output image with the light source color of the illumination light to the original image changed is determined using a desired illumination light source color.

Figure 6:
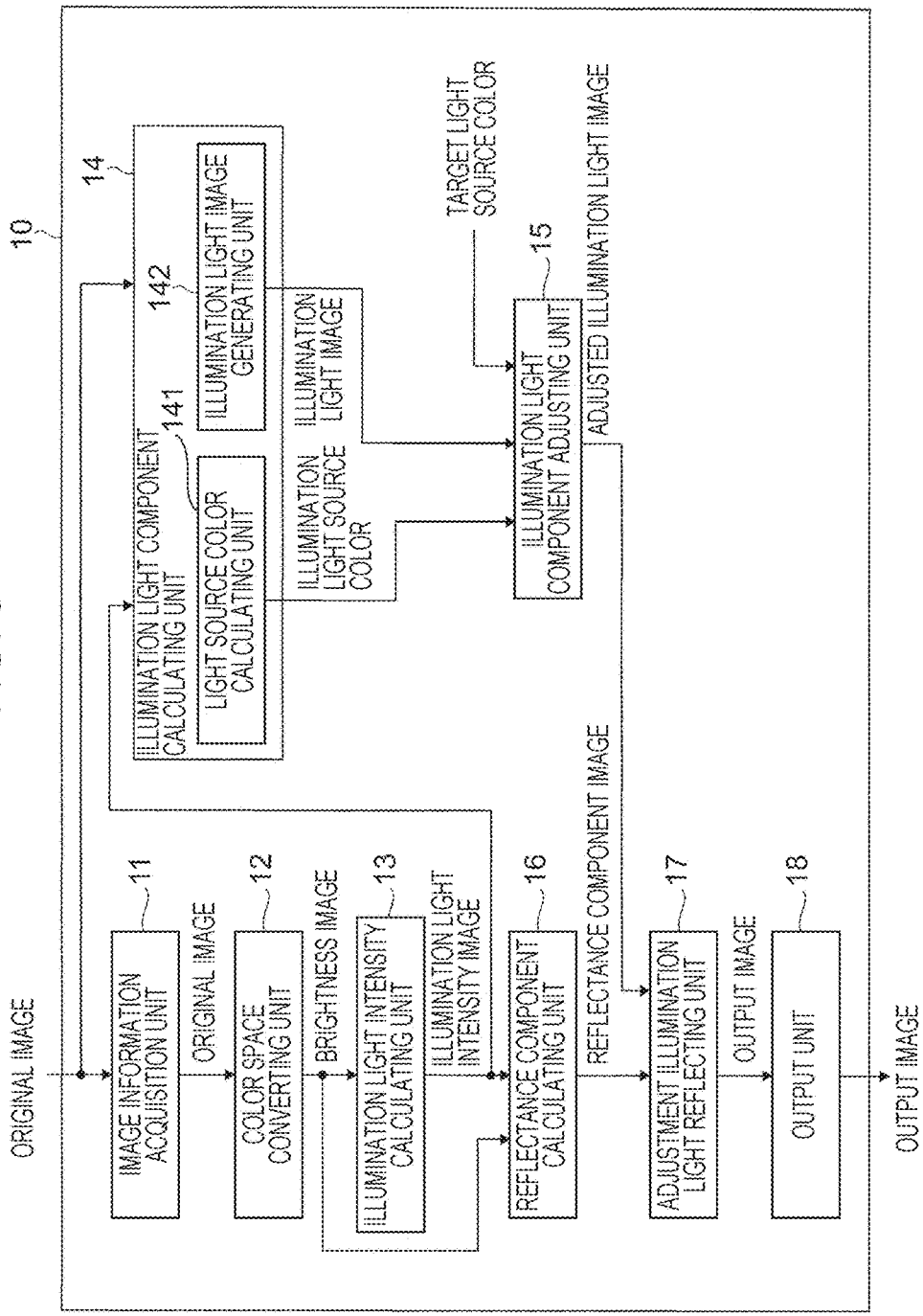
FIG. 6 is a block diagram illustrating a functional configuration of an image processing apparatus of a second exemplary embodiment.

FIG. 6 is a block diagram illustrating a functional configuration of the image processing apparatus 10 of the second exemplary embodiment.

The image processing apparatus 10 illustrated in FIG. 6 is identical to the image processing apparatus 10 of the first exemplary embodiment of FIG. 2 in that each image processing apparatus 10 includes the image information acquisition unit 11, the color space converting unit 12, the illumination light intensity calculating unit 13, and the output unit 18. On the other hand, the image processing apparatus 10 of FIG. 6 is different from the image processing apparatus 10 of the first exemplary embodiment in that the image processing apparatus 10 of FIG. 6 includes an illumination light component calculating unit 14, an illumination light component adjusting unit 15, a reflectance component calculating unit 16, and an adjustment illumination light reflecting unit 17.

The functions of the image information acquisition unit 11, the color space converting unit 12, and the illumination light intensity calculating unit 13 are identical to those of the first exemplary embodiment. Described below are the illumination light component calculating unit 14, the illumination light component adjusting unit 15, the reflectance component calculating unit 16, the adjustment illumination light reflecting unit 17, and the output unit 18.

The illumination light component calculating unit 14 includes the light source color calculating unit 141 and the illumination light image generating unit 142 described above.

The light source color calculating unit 141 is similar in function to the light source color calculating unit 141 of the first exemplary embodiment, and determines the illumination light source color C that is the light source color of the illumination light to the original image.

The illumination light image generating unit 142 generates the illumination light image that represents an amount of contribution of the illumination light component acquired from the original image.

In accordance with the first exemplary embodiment, the illumination light image is calculated from the original image and the illumination light intensity image. In such a case, the illumination light image is the RGB data, and the pixel value at coordinates (i,j) of the illumination light image is $(R,G,B)=(L_R(i,j), L_G(i,j), L_B(i,j))$. $(L_R(i,j), L_G(i,j), L_B(i,j))$ is expressed by formula (7) using a pixel value $L_V(i,j)$ of the illumination light intensity image at the same coordinates and a pixel value $(I_R(i,j), I_G(i,j), I_B(i,j))$ of the original image.

$F_1$ is a function that causes the values of $(L_R(i,j), L_G(i,j), L_B(i,j))$ to be fall within a range from a gradation value 0 to a gradation 255 with the pixel value in parentheses being a variable. $F_1$ is expressed by formula (8). In formula (8), normalize(x,y) is a function that normalize a product of x and y to the gradation values 0 to 255.

$$L_R(i,j)=F_1(L_V(i,j),I_R(i,j))$$

$$L_G(i,j)=F_1(L_V(i,j),I_G(i,j))$$

$$L_B(i,j)=F_1(L_V(i,j),I_B(i,j)) \quad (7)$$

$$F_1(x,y)=\text{normalize}(x,y) \quad (8)$$

The illumination light intensity image includes as a pixel value the illumination light component that is a scalar quantity, and the illumination light intensity image does not have information concerning color. In contrast, the illumination light image of the first exemplary embodiment is determined by multiplying each pixel value of the original image and a corresponding pixel value of the illumination light intensity image, and by normalizing the product, and the illumination light image is thus a three-dimensional vector quantity. The illumination light image has information concerning color, and is understood as an amount of contribution of the illumination light component acquired from the original image. The illumination light image may also be understood as a color image version of the illumination light intensity image.

In the example of formulas (7) and (8), the pixel value of the original image and the pixel value of the illumination light intensity image are multiplied, and the illumination light image is determined in accordance with the product. The second exemplary embodiment is not limited to this method.

A non-linear calculation method as expressed by formula (9) may be used, for example. In formula (9), the pixel of the original image and the corresponding pixel of the illumination light intensity image are multiplied, and a gamma correction operation is performed on the product. In formula (9), $\gamma$ is a gamma value, and is 0.5, for example. In this case, the geometrical mean of the pixel values of the original image and the illumination light intensity image is determined. K is a proportionality constant, and is 0.8, for example.

$$L_R(i,j)=K(L_V(i,j)I_R(i,j))^\gamma$$

$$L_G(i,j)=K(L_V(i,j)I_G(i,j))^\gamma$$

$$L_B(i,j)=K(L_V(i,j)I_B(i,j))^\gamma \quad (9)$$

As expressed by formula (10), the gamma correction operation may be performed on the pixel values of the original image and the illumination light intensity image, and then the corrected pixel values may be multiplied. In formula (10), $\gamma_1$ and $\gamma_2$ are gamma values, and are $\gamma_1=0.8$ and $\gamma_2=0.8$.

$$L_R(i,j)=L_V(i,j)^{\gamma_1}I_R(i,j)^{\gamma_2}$$

$$L_G(i,j)=L_V(i,j)^{\gamma_1}I_G(i,j)^{\gamma_2}$$

$$L_B(i,j)=L_V(i,j)^{\gamma_1}I_B(i,j)^{\gamma_2} \quad (10)$$

Which of formulas (7) through (10) is to be used to generate the illumination light image depends on the image.

The illumination light component adjusting unit 15 performs a color adjustment to match the illumination light image to a target light source color that is a light source color serving as a target.

The color adjustment of the illumination light image is herein performed using the illumination light source color C determined by the light source color calculating unit 141 and a target light source color $C_t$ that serves as a target for the light source color. The color-adjusted illumination light image thus results. The target light source color $C_t$ is the RGB data, and is herein $C_t=(L_{Rt}, L_{Gt}, L_{Bt})$.

More specifically, the pixel value of a pixel positioned at coordinates (i,j) of the adjusted illumination light image (adjusted illumination light component) is $(R,G,B)=(L_R'(i,j), L_G'(i,j), L_B'(i,j))$, and is expressed by formula (11):

$$L_R'(i,j)=L_R(i,j)-\overline{L}_R+L_{Rt}$$

$$L_G'(i,j)=L_G(i,j)-\overline{L}_G+L_{Gt}$$

$$L_B'(i,j)=L_B(i,j)-\overline{L}_B+L_{Bt} \quad (11)$$

The color adjustment may be performed using a parameter w as expressed by formula (12). The parameter w is a weight parameter that includes a value different depending on a pixel position, such as a pixel value $L_v(i,j)$ or a saturation component $S(i,j)$ of the smoothed image (smoothed brightness image). The parameter w determines what pixel characteristic of the illumination light component is to be adjusted in the image.

$$L_R'(i,j)=w(L_R(i,j)-\overline{L}_R+L_{Rt})+(1-w)L_R(i,j)$$

$$L_G'(i,j)=w(L_G(i,j)-\overline{L}_G+L_{Gt})+(1-w)L_G(i,j)$$

$$L_B'(i,j)=w(L_B(i,j)-\overline{L}_B+L_{Bt})+(1-w)L_B(i,j) \quad (12)$$

The weight parameter $w_{i,j}$ is determined from the pixel value $L_v(i,j)$ and a saturation component $S(i,j)$ of the smoothed image (smoothed brightness image) in accordance with formula (13). The weight parameter $w_{i,j}$ represents a weight parameter w at position coordinates (i,j). In this way, the color of a high saturation region strongly affected by a color of an object has a smaller adjustment amount in the color adjustment and the pixel value in the original image is easy to be preserved. In contrast, a region of brighter and lower saturation strongly affected by the color of the illumination light has a larger adjustment amount in the color adjustment.

In formula 13, $k_s$, $B_s$ and $\gamma_s$ are predetermined parameters, and $w_s$ is set to fall within a range from 0 to 1 by adjusting a function N(x) as expressed in formula (14).

$$w_{i,j} = \sqrt{w_L w_S} \quad (13)$$
$$w_L = L_V(i,j)$$
$$w_S = N(k_S \times N(1.0 - S(i,j) + B_S)^{\gamma_S}$$

$$N(x) \begin{cases} 0.0 & (x < 0.0) \\ x & (0.0 \le x \le 1.0) \\ 1.0 & (x > 1.0) \end{cases} \quad (14)$$

Figure 7:
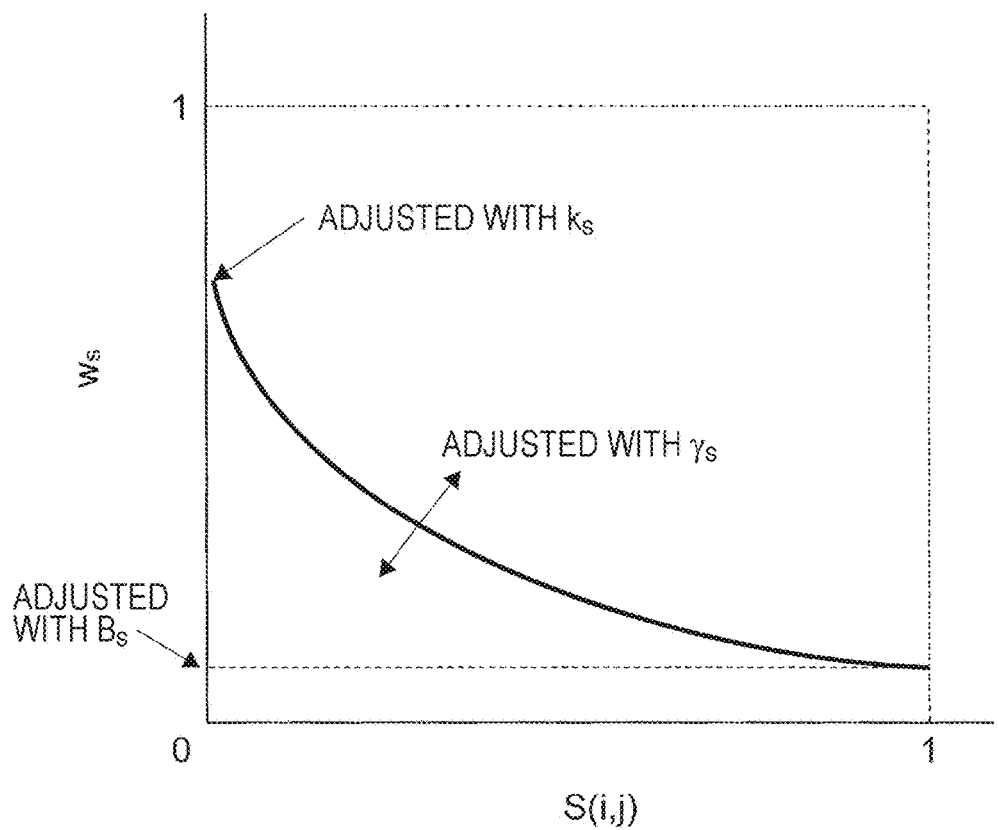
FIG. 7 illustrates a relationship between $S(i,j)$ and $w_s$.

FIG. 7 illustrates a relationship between S(i,j) and $w_s$.

In FIG. 7, the abscissa represents S(i,j), and the ordinate represents $w_s$.

In this case, the relationship between S(i,j) and $w_s$ is adjusted by adjusting each of the parameters $k_s$, $B_s$, and $\gamma_s$ as illustrated in FIG. 7. More specifically, the upper limit of $w_s$ is determined by adjusting the parameter $k_s$. The lower limit of $w_s$ is determined by adjusting the parameter $B_s$. A curve representing the relationship between S(i,j) and $w_s$ is varied by adjusting the parameter $\gamma_s$.

The function N(x) expressed by formula (14) is used herein to obtain the weight parameter $w_{i,j}$. Any function may be used as long as the function has a similar effect. Also, a similar function may be used to determine $W_L$.

The target light source color $C_t$ may be a value prepared in advance. The target light source color $C_t$ may also be calculated in advance from the illumination light source color C in accordance with formula (15).

$$L_{Rt} = L_{Gt} = L_{Bt} = \frac{\overline{L}_R + \overline{L}_G + \overline{L}_B}{3} \quad (15)$$

A function $F_2$ may be defined. The function F2 may determine a pixel value in the adjusted illumination light image from a pixel value in the illumination light image, the illumination light source color C, and the target light source color $C_t$. By defining the function $F_2$, the pixel value in the adjusted illumination light image may be calculated in accordance with formula (16).

$$L_R'(i,j)=F_2(L_R(i,j),\overline{L}_R,L_{Rt})$$

$$L_G'(i,j)=F_2(L_G(i,j),\overline{L}_G,L_{Gt})$$

$$L_B'(i,j)=F_2(L_B(i,j),\overline{L}_B,L_{Bt}) \quad (16)$$

The reflectance component calculating unit 16 determines a reflectance component image having a reflectance component in the original image as a pixel value.

The reflectance component image is an image that includes a reflectance component when the original image is separated into the illumination light component and the reflectance component through the image processing based on the retinex principle.

In accordance with the second exemplary embodiment, the reflectance component image is generated using the brightness image and the illumination light intensity image.

In accordance with the second exemplary embodiment, it is assumed that formula (17) holds between the brightness value V(i,j) and the reflectance component $R_v(i,j)$ of the brightness image. The reflectance component $R_v(i,j)$ represents a reflectance component of a pixel at coordinates (i,j).

$$V(i,j)=L_V(i,j)R_V(i,j) \quad (17)$$

The reflectance component $R_v(i,j)$ is calculated using formula (18) that is derived from formula (17), and the reflectance component image formed of the reflectance component $R_v(i,j)$ is generated.

$$R_V(i, j) = \frac{V(i, j)}{L_V(i, j)} \quad (18)$$

The adjustment illumination light reflecting unit 17 determines an output image that results from matching the original image to a target light source color in accordance with the color-adjusted illumination light image and the reflectance component image.

In accordance with the second exemplary embodiment, a pixel value (an adjusted illumination light component) $L_R'$(i,j), $L_G'$(i,j), and $L_B'$(i,j) of a pixel at coordinates (i,j) of the adjusted illumination light image is multiplied by a reflectance component $R_v$(i,j) at the same coordinates in accordance with formula (19) to determine image data of an output image (R,G,B)=($I_R'$(i,j), $I_G'$(i,j), $I_R'$(i,j)).

In accordance with the second exemplary embodiment, the illumination light image generating unit 142 and the reflectance component calculating unit 16 separate the original image into the illumination light image and the reflectance component image. The adjustment illumination light reflecting unit 17 recombines the adjusted illumination light image and the reflectance component image, thereby resulting in an image in a state similar to the original image. However, the output image generated by the adjustment illumination light reflecting unit 17 includes the original image whose the illumination light source color has been adjusted.

$$I_R'(i,j)=L_R'(i,j)R_V(i,j)$$

$$I_G'(i,j)=L_G'(i,j)R_V(i,j)$$

$$I_B'(i,j)=L_B'(i,j)R_V(i,j) \quad (19)$$

The output unit 18 outputs the image data of the output image. The image data of the output image is displayed on the display 20 (see FIG. 1), for example.

The process of the image processing apparatus 10 of the second exemplary embodiment is described below.

Figure 8:
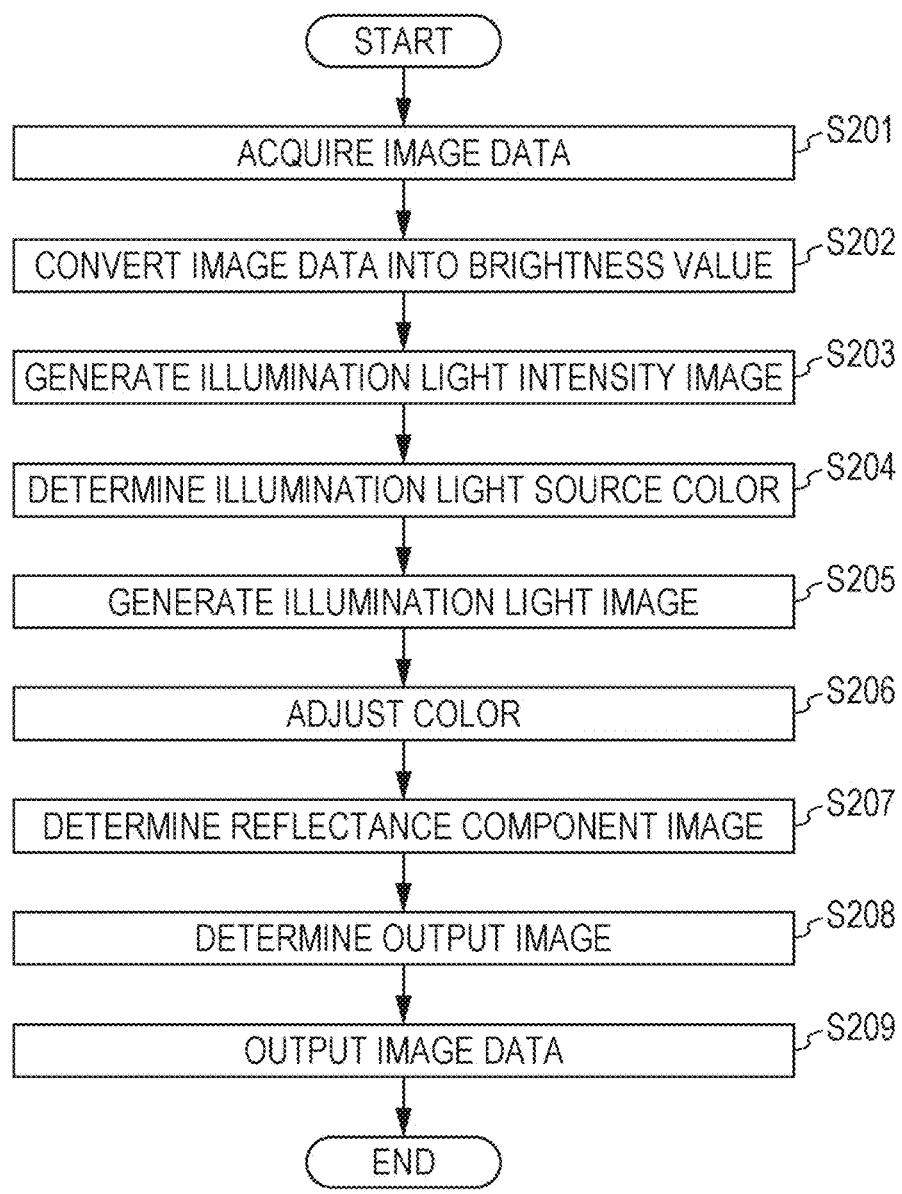
FIG. 8 is a flowchart illustrating a process of the image processing apparatus of the second exemplary embodiment.

FIG. 8 is a flowchart illustrating the process of the image processing apparatus 10 of the second exemplary embodiment.

Operations in steps S201 through S204 are identical to those in steps S101 through S104 of FIG. 5. Operations in step S205 thereafter are described below.

Subsequent to step S204, the illumination light image generating unit 142 generates the illumination light image by picking up an amount of contribution of the illumination light component from the original image (step S205). More specifically, the illumination light image generating unit 142 calculates the illumination light components $L_R$(i,j), $L_G$(i,j), and $L_B$(i,j) from the original image and the illumination light intensity image in accordance with formulas (7) through (10).

The illumination light component adjusting unit 15 performs the color adjustment to match the illumination light image to the target light source color serving as a target of the light source color (step S206). More specifically, the illumination light component adjusting unit 15 performs the color adjustment on the illumination light components $L_R$(i,j), $L_B$(i,j), and $L_B$(i,j) in accordance with formulas (11) through (14) using the illumination light source color C and the target light source color $C_t$. The illumination light component adjusting unit 15 thus determines the adjusted illumination light components $L_B'$(i,j), $L_G'$(i,j), and $L_B'$(i,j).

The reflectance component calculating unit 16 determines the reflectance component image having a reflectance component of the original image as a pixel value (step S207). In accordance with the second exemplary embodiment, the reflectance component $R_v$(i,j) is generated in accordance with formula (18) using the brightness value V(i,j).

The adjustment illumination light reflecting unit 17 determines the output image that is an image that results from matching the original image to the target light source color, based on the adjusted illumination light image and the reflectance component image (step S208). In accordance with the second exemplary embodiment, the adjusted illumination light components $L_R'$(i,j), $L_G'$(i,j), and $L_B'$(i,j) are multiplied by the reflectance component $R_v$(i,j) in accordance with formula (19), and the product is the image data of the output image.

The output unit 18 outputs the image data of the output image (step S209).

In accordance with the second exemplary embodiment, the color adjustment is performed on the original image in view of the illumination light source color prepared in advance. In this way, images in a variety of illumination light source colors may be reproduced. For example, if the illumination light source color is white, the function of auto-white balance is implemented.

Third Exemplary Embodiment

An image processing apparatus 10 of a third exemplary embodiment is described below.

In accordance with the third exemplary embodiment, the target light source color is set in response to an instruction from the user.

Figure 9:
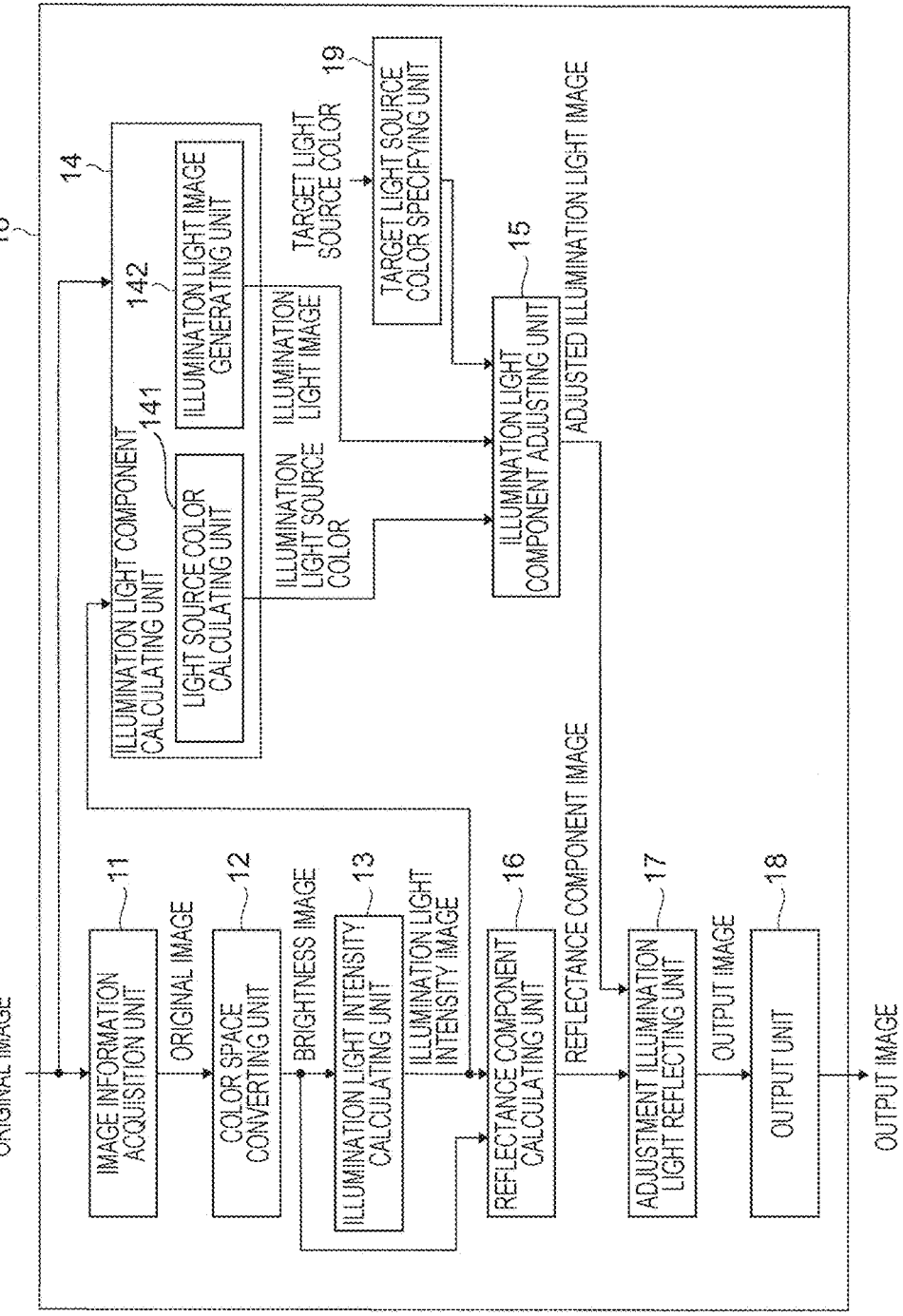
FIG. 9 is a block diagram illustrating a functional configuration of an image processing apparatus of a third exemplary embodiment.

FIG. 9 is a block diagram illustrating a functional configuration of the image processing apparatus 10 of the third exemplary embodiment.

The image processing apparatus 10 of FIG. 9 is different from the image processing apparatus 10 of the second exemplary embodiment illustrated in FIG. 6 in that the image processing apparatus 10 of FIG. 9 includes a target light source color specifying unit 19. The functions the elements other than the target light source color specifying unit 19 are identical to those of the second exemplary embodiment. The target light source color specifying unit 19 is thus described below.

The target light source color specifying unit 19 acquires the target light source color specified by the user.

In accordance with the second exemplary embodiment, the target light source color is prepared or calculated in advance. In accordance with the third exemplary embodiment, the target light source color specifying unit 19 sets the target light source color as specified by the user.

The user may specify the target light source color using RGB values. Alternatively, the user may specify the target light source color by operating the input device 30 (see FIG. 1) on the screen displayed on the display 20 (see FIG. 1).

Figure 10A:
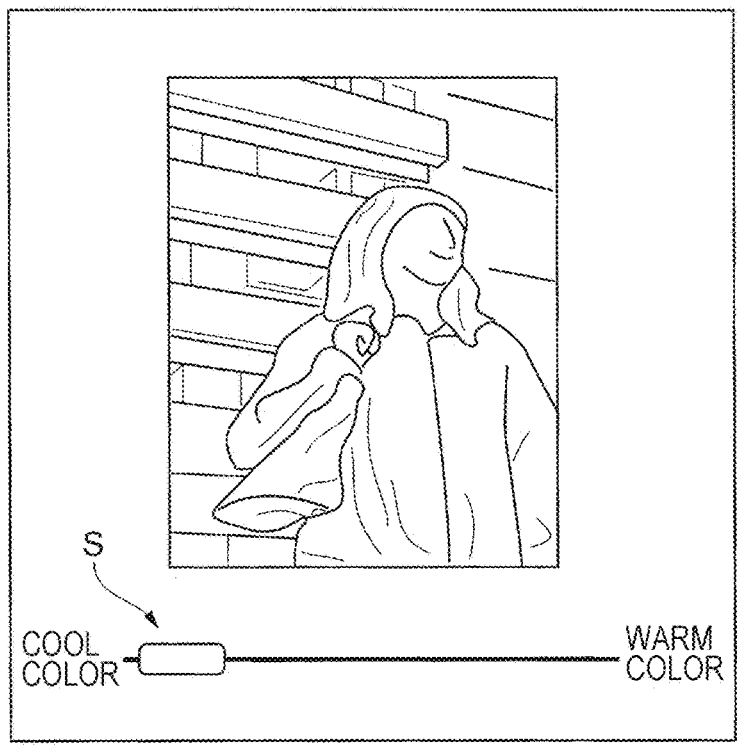
FIG. 10A and FIG. 10B illustrate a user interface on which a user specifies a target light source color.
Figure 10B:
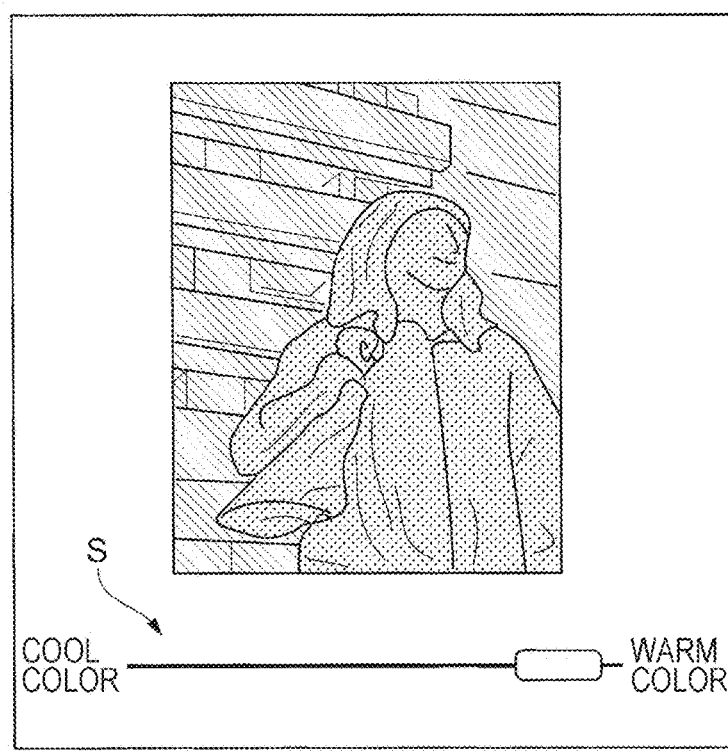

FIG. 10A and FIG. 10B illustrate a user interface through which the user specifies the target light source color.

Referring to FIG. 10A and FIG. 10B, the user interface includes the degrees of color, such as "warm color" and "cool color", and a slider S that is slid therebetween. RGB values corresponding to the degrees of color, such as "warm color" and "cool color", are preset. When the user moves the slider S, the corresponding RGB values are set to be the target light source color. For example, the target light source color of the worm color is set to be (R,G,B)=(200, 180, 180), and the target light source color of the cool color is set to be (R,G,B)=(180, 180, 200). A target light source color between these values is calculated through interpolation in response to the position of the slider S. The interpolation method may be linear interpolation. The RGB values may be converted into values in a color space, such as CIELab, which accounts for visual property, the converted values are linearly interpolated, and the results are converted back again into RGB values. The RGB values may then be used.

Referring to FIG. 10A and FIG. 10B, the user specifies the target light source color using the slider S. The third exemplary embodiment is not limited to the slider S. A similar interface configured for the user to give an instruction, for example, for the user to perform a swipe operation on a touchpanel, may be used.

Referring to FIG. 10A and FIG. 10B, the user specifies the target light source color between the "warm color" and the "cool color". The third exemplary embodiment is not limited to this method. For example, the user may prepare a palette on which sample colors of the target light source color are arranged, and specifies a color from among the sample colors. Alternatively, the user may input the color temperature of white.

The process of the image processing apparatus 10 of the third exemplary embodiment is described below.

FIG. 11 is a flowchart illustrating the process of the image processing apparatus 10 of the third exemplary embodiment.

Operations steps S301 through S305 are identical to those in steps S201 through S205 of FIG. 8.

Subsequent to step S305, the target light source color specifying unit 19 sets the target light source color as specified by the user (step S306).

In response to the target light source color set by the target light source color specifying unit 19, the image processing is performed to modify the light source color of the illumination light to the original image. Operations in steps S307 through S310 are identical to those in steps S206 through S209.

In accordance with the third exemplary embodiment, the original image is color adjusted to match the illumination light source color specified by the user. In this way, the color balance of the original image is adjusted.

Fourth Exemplary Embodiment

An image processing apparatus 10 of a fourth exemplary embodiment is described below.

In accordance with the fourth exemplary embodiment, the target light source color is acquired from sample images.

Figure 12:
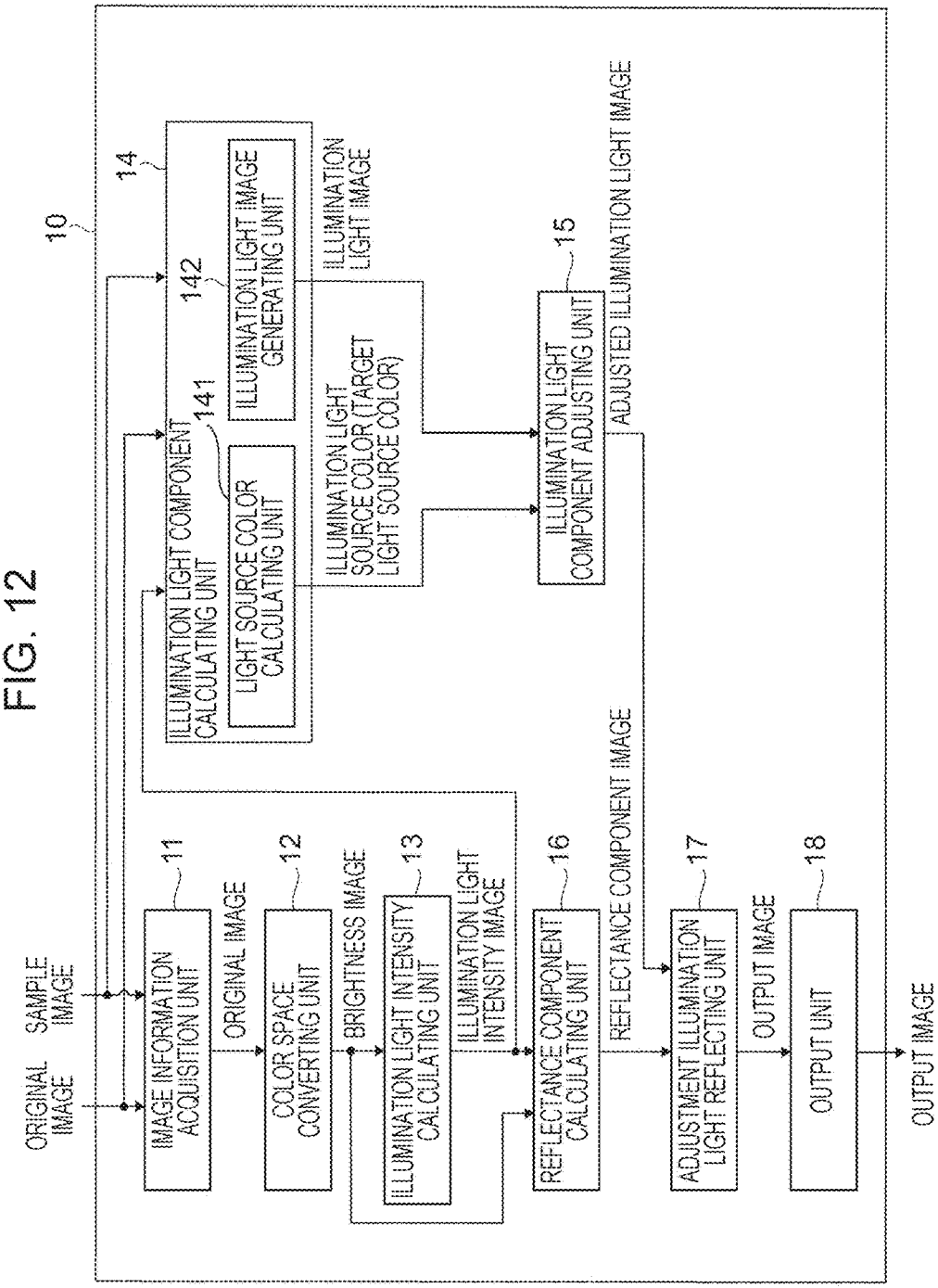
FIG. 12 is a block diagram illustrating a functional configuration of an image processing apparatus of a fourth exemplary embodiment.

FIG. 12 is a block diagram illustrating a functional configuration of the image processing apparatus 10 of the fourth exemplary embodiment.

The image processing apparatus 10 of FIG. 12 is identical in functional configuration to the image processing apparatus 10 of the second exemplary embodiment of FIG. 6.

However, the image information acquisition unit 11 acquires image data serving as a sample image in addition to the image data of the original image. In this case, the sample image includes an image having an impression desired by the user, and serves as a sample that is used to perform the image processing on the original image.

The color space converting unit 12, the illumination light intensity calculating unit 13, and the light source color calculating unit 141 perform on the sample image a process identical to a process that is performed on the original image. As a result, the light source color calculating unit 141 outputs the illumination light source color of the sample image. The illumination light source color determined for the sample image is the target light source color. It may be understood that the illumination light intensity calculating unit 13 and the light source color calculating unit 141 respectively determine the illumination light intensity image and the illumination light source color of the sample image, and that the illumination light source color of the sample image is the target light source color.

The process of the image processing apparatus 10 of the fourth exemplary embodiment is described below.

Figure 13:
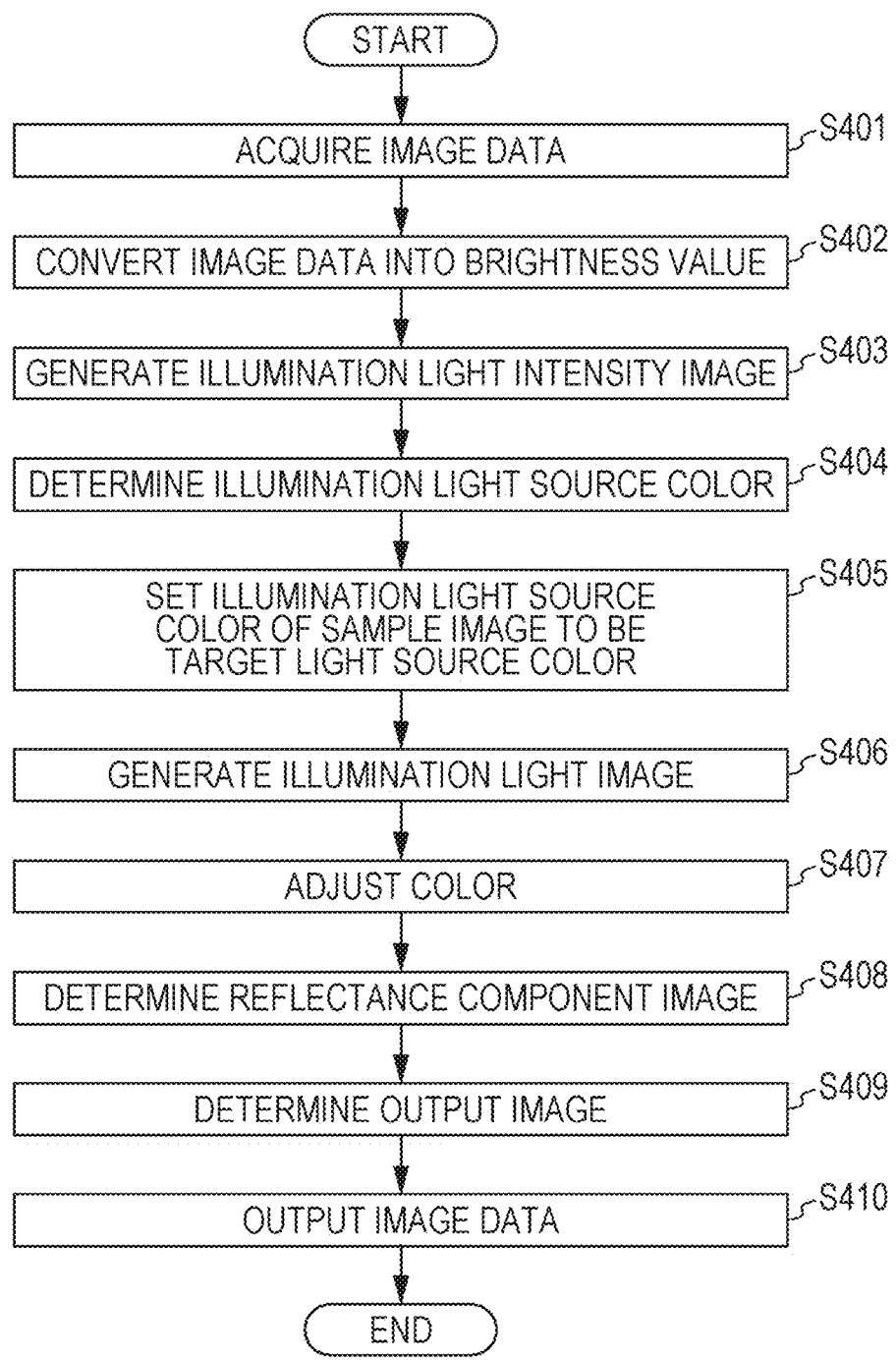
FIG. 13 is a flowchart illustrating a process of the image processing apparatus of the fourth exemplary embodiment.

FIG. 13 is a flowchart illustrating the process of the image processing apparatus 10 of the fourth exemplary embodiment.

The image information acquisition unit 11 acquires the image data of sample image together the image data of the original image (step S401). The image data of the original image and the sample image is the RGB data, for example.

The color space converting unit 12 converts the RGB data as the image data of the original image and the sample image into the V data that is a brightness value in the HSV color space (step S402). This conversion may be performed using formula (1), for example.

Using the Gaussian function expressed by formula (2), the illumination light intensity calculating unit 13 generates multiple smoothed images (smoothed brightness images) by performing the convolution operation on the brightness image including the V data, and then generates the illumination light intensity image by calculating the mean value of the multiple smoothed images (smoothed brightness images) on a per pixel basis (step 403). This operation is performed on the brightness image formed from the original image and the brightness image formed from the sample image. This operation may be performed in accordance with formula (3).

The light source color calculating unit 141 determines the illumination light source color by calculating the weighted mean of the pixel values of the original image using as a weight a pixel value of the illumination light intensity image (step S404). This operation may be performed in accordance with formulas (5) and (6), for example. The light source color calculating unit 141 sets the illumination light source color determined from the sample image to be the target light source color (step S405).

Subsequent operations in steps S406 through S410 are identical to those in steps S205 through S209 of FIG. 8.

In accordance with the fourth exemplary embodiment, the original image is color adjusted to match the illumination light source color of the sample image. In this way, the image matching the illumination light source color of the sample image is reproduced.

Fifth Exemplary Embodiment

An image processing apparatus 10 of a fifth exemplary embodiment is described below.

In accordance with the fifth exemplary embodiment, the illumination light component adjusting unit 15 adjusts a contrast component in addition to the color adjustment of the illumination light image.

The image processing apparatus 10 of the fifth exemplary embodiment is identical in function to the image processing apparatus 10 of the second exemplary embodiment of FIG. 6.

In accordance with the second exemplary embodiment, the illumination light component adjusting unit 15 performs the color adjustment of the illumination light image in accordance with formula (11), thereby obtaining the adjusted illumination light image. In accordance with the fifth exemplary embodiment, the contrast of the illumination light component is adjusted using an illumination light contrast parameter $C_f$ of the image.

If the illumination light contrast parameter $C_f$ is used, formula (11) is modified to formula (20):

$$L_R'(i,j)=(L_R(i,j)-\overline{L}_R)C_f+L_{Rt}$$

$$L_G'(i,j)=(L_G(i,j)-\overline{L}_G)C_f+L_{Gt}$$

$$L_B'(i,j)=(L_B(i,j)-\overline{L}_B)C_f+L_{Bt} \quad (20)$$

The function in use is not limited to formula (20). Another function may be employed as long as the function is used to adjust the contrast of the illumination light component.

The process of the image processing apparatus 10 of the fifth exemplary embodiment is described below.

Figure 14:
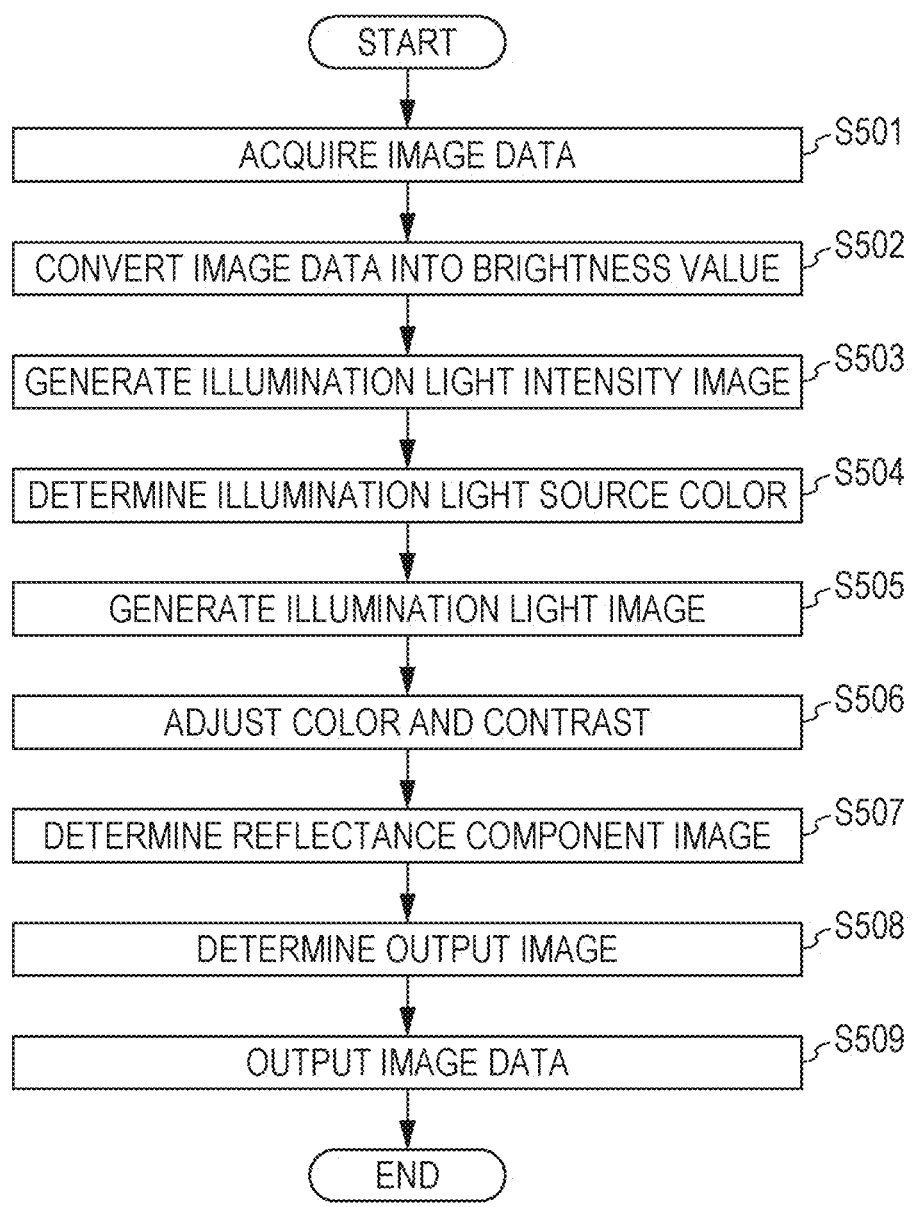
FIG. 14 is a flowchart illustrating a process of an image processing apparatus of a fifth exemplary embodiment.

FIG. 14 is a flowchart illustrating the process of the image processing apparatus 10 of the fifth exemplary embodiment.

Operations in steps S501 through S505 are identical to those in steps S201 through S201 of FIG. 8.

Subsequent to step S505, the illumination light component adjusting unit 15 performs the color adjustment to match the illumination light image to the target light source color that is a light source color serving as a target, while performing the contrast adjustment (step S506). More specifically, the illumination light component adjusting unit 15 performs the color adjustment and the contrast adjustment on the illumination light component $L_R(i,j)$, $L_R(i,j)$, and $L_B(i,j)$ in accordance with formula (20) using the illumination light source color C, the target light source color $C_t$, and the illumination light contrast parameter $C_f$, thereby determining the adjusted illumination light component $L_R'(i,j)$, $L_G'(i,j)$, and $L_B'(i,j)$.

Operations in steps S507 through S509 are identical to those in steps S207 through S209 of FIG. 8.

In accordance with the fifth exemplary embodiment, the contrast of the illumination light to the original image may be adjusted. An image reflecting the intensity of the illumination light may thus be reproduced. A more naturally reproduced image results when images of a variety of illumination light source color are reproduced.

A hardware configuration of the image processing apparatus 10 is described below.

Figure 15:
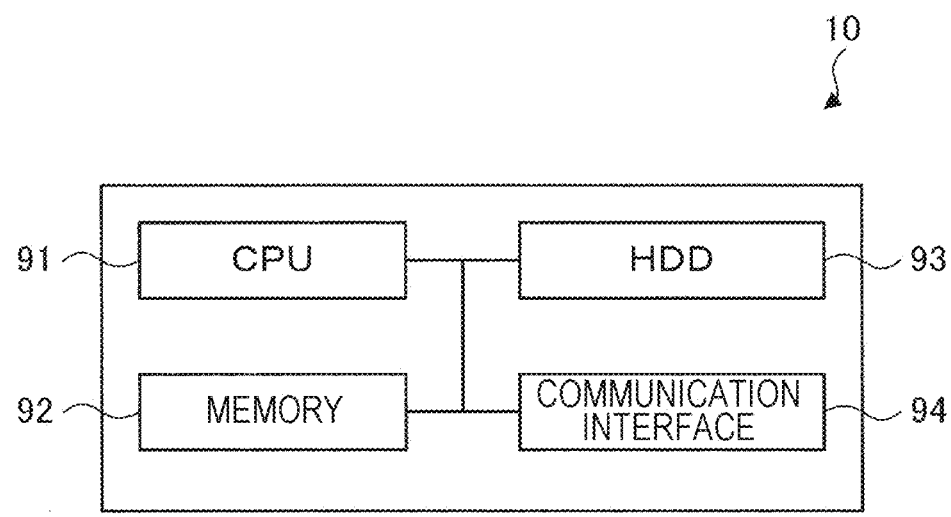
FIG. 15 illustrates a hardware configuration of the image processing apparatus.

FIG. 15 illustrates the hardware configuration of the image processing apparatus 10.

The image processing apparatus 10 is implemented by a personal computer. Referring to FIG. 15, the image processing apparatus 10 includes a central processing unit (CPU) 91, a memory 92, and a hard disk drive (HDD) 93. The CPU 91 executes an operating system (OS), and a variety of application programs. The memory 92 serves as a storage area that stores the variety of programs and data for use in the programs. The HDD 93 serves as a storage area that stores data input to the programs and data output from the programs.

The image processing apparatus 10 further includes a communication interface 94 that is used to communicate with the outside.

The processes to be performed by the image processing apparatuses 10 of the exemplary embodiments are prepared as a program, such as application software.

The process to be performed by the image processing apparatus 10 of the first exemplary embodiment is understood as a program to cause the computer to perform an illumination light intensity calculating function that determines, from a brightness value based on a pixel value of each pixel forming an original image, an illumination light intensity image having as a pixel value an illumination light component of the original image, using at least one smoothed image having the brightness value that is smoothed using at least a smoothing degree and a light source color calculating function that determines an illumination light source color as an light source color of illumination light in accordance with the original image and the illumination light intensity image.

The process to be performed by the image processing apparatus 10 of the second exemplary embodiment is understood as a program to cause the computer to perform an illumination light image generating function that generates an illumination light image that represents an amount of contribution of the illumination light component acquired from the original image, an illumination light component adjusting function that performs a color adjustment to match the illumination light image to a target light source color that is a target of the light source color, a reflectance component calculating function that determines a reflectance component image having as a pixel value a reflectance component of the original image, and an adjustment illumination light reflecting function that determines, from the illumination light image subsequent to the color adjustment and the reflectance component image, an output image that is an image that results from matching the original image to the target light source color.

The program that implements the exemplary embodiments may be provided not only via a communication system but also via a recording medium, such as a compact disk read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a central processing unit (CPU) configured to:
        determine, from a brightness value based on a pixel value of each pixel forming an original image, an illumination light intensity image having as a pixel value an illumination light component of the original image, using at least one smoothed image having the brightness value that is smoothed using at least a smoothing degree; and
        determine an illumination light source color as a light source color of illumination light in accordance with the original image and the illumination light intensity image,
    wherein the illumination light source color is determined by calculating a weighted mean of the pixel values of the original image using a pixel value of the illumination light intensity image as a weight, the pixel value of the illumination light intensity image corresponding to a pixel value of the original image.

2. The image processing apparatus according to claim 1, wherein the CPU is further configured to:
    generate an illumination light image that represents an amount of contribution of the illumination light component acquired from the original image;

perform a color adjustment to match the illumination light image to a target light source color that is a target of the light source color;

determine a reflectance component image having as a pixel value a reflectance component of the original image; and determine, from the illumination light image subsequent to the color adjustment and the reflectance component image, an output image that is an image that results from matching the original image to the target light source color.

3. The image processing apparatus according to claim 2, wherein the CPU is further configured to acquire the target light source color specified by a user.

4. The image processing apparatus according to claim 2, wherein the CPU is further configured to determine the illumination light intensity image and the illumination light source color of a sample image, and set the illumination light source color of the sample image to be the target light source color.

5. The image processing apparatus according to claim 2, wherein the CPU is further configured to perform a contrast adjustment.

6. An image processing method comprising:

determining, from a brightness value based on a pixel value of each pixel forming an original image, an illumination light intensity image having as a pixel value an illumination light component of the original image, using at least one smoothed image having the brightness value that is smoothed using at least a smoothing degree; and determining an illumination light source color as a light source color of illumination light in accordance with the original image and the illumination light intensity image, by calculating a weighted mean of the pixel values of the original image using a pixel value of the illumination light intensity image as a weight, the pixel value of the illumination light intensity image corresponding to a pixel value of the original image.

7. The image processing method according to claim 6, further comprising:

generating an illumination light image that represents an amount of contribution of the illumination light component acquired from the original image;

performing a color adjustment to match the illumination light image to a target light source color that is a target of the light source color;

determining a reflectance component image having as a pixel value a reflectance component of the original image; and determining, from the illumination light image subsequent to the color adjustment and the reflectance component image, an output image that is an image that results from matching the original image to the target light source color.

8. A non-transitory computer readable medium storing a program causing a computer to execute a process for processing an image, the process comprising:

determining, from a brightness value based on a pixel value of each pixel forming an original image, an illumination light intensity image having as a pixel value an illumination light component of the original image, using at least one smoothed image having the brightness value that is smoothed using at least a smoothing degree; and determining an illumination light source color as a light source color of illumination light in accordance with the original image and the illumination light intensity image, by calculating a weighted mean of the pixel values of the original image using a pixel value of the illumination light intensity image as a weight, the pixel value of the illumination light intensity image corresponding to a pixel value of the original image.

9. The non-transitory computer readable medium according to claim 8, wherein the process further comprising:

generating an illumination light image that represents an amount of contribution of the illumination light component acquired from the original image;

performing a color adjustment to match the illumination light image to a target light source color that is a target of the light source color;

determining a reflectance component image having as a pixel value a reflectance component of the original image; and determining, from the illumination light image subsequent to the color adjustment and the reflectance component image, an output image that is an image that results from matching the original image to the target light source color.

* * * * *